US006966703B1

(12) United States Patent
Lebby et al.

(10) Patent No.: US 6,966,703 B1
(45) Date of Patent: Nov. 22, 2005

(54) SELF EJECT LATCH MECHANISM FOR AN OPTICAL TRANSCEIVER MODULE

(75) Inventors: Michael S. Lebby, Apache Junction, AZ (US); Samuel Ho, Fremont, CA (US)

(73) Assignee: Bookham Technology PLC, Northhamptonshire (GB)

( * ) Notice: Subject to any disclaimer, the term of this patent is extended or adjusted under 35 U.S.C. 154(b) by 0 days.

(21) Appl. No.: 10/769,967

(22) Filed: Feb. 2, 2004

Related U.S. Application Data

(60) Provisional application No. 60/444,593, filed on Feb. 3, 2003.

(51) Int. Cl.[7] .......................... G02B 6/36; H04B 10/00

(52) U.S. Cl. .......................... 385/76; 385/77; 385/88; 385/92; 385/89; 398/135; 398/138

(58) Field of Search .......................... 385/53, 58, 60, 385/70, 76, 77, 88, 89, 92, 94; 398/135, 138, 398/139

(56) References Cited

U.S. PATENT DOCUMENTS

| | | | | |
|---|---|---|---|---|
| 6,485,322 | B1 * | 11/2002 | Branch et al. | 439/357 |
| 6,692,159 | B2 * | 2/2004 | Chiu et al. | 385/53 |
| 6,796,715 | B2 * | 9/2004 | Chiu et al. | 385/53 |
| 6,881,095 | B2 * | 4/2005 | Murr et al. | 439/607 |
| 2003/0171022 | A1 * | 9/2003 | Distad et al. | 439/372 |

* cited by examiner

*Primary Examiner*—Brian M. Healy
(74) *Attorney, Agent, or Firm*—Parsons & Goltry; Robert A. Parsons; Michael W. Goltry

(57) ABSTRACT

An actuator-based latching/delatching mechanism in combination with an optical module includes a housing having a front face with an opening and an optical transceiver designed to be nestingly engaged in the opening. A front surface of the transceiver is flush with the face of the housing in a fully nestingly engaged orientation. A pivot arm is pivotally mounted adjacent a rear end of the housing for pivotal movement between a latching orientation in which the transceiver is fully nestingly engaged in the housing and a delatching orientation in which a force pivots the arm against the transceiver to move the transceiver out of the engaged orientation. An actuator, with an end accessible exterior of the housing, is mounted in the housing for movements from latching to delatching orientations in response to a force applied to the end of the actuator.

6 Claims, 4 Drawing Sheets

SELF EJECT LATCH MECHANISM FOR AN OPTICAL TRANSCEIVER MODULE

CROSS-REFERENCE TO RELATED APPLICATIONS

This application claims the benefit of U.S. Provisional Application No. 60/444,593, filed 3 Feb. 2003.

FIELD OF THE INVENTION

This invention relates to transceiver packages and, more particularly, to latching and delatching apparatus for transceiver packages.

BACKGROUND OF THE INVENTION

At the present time, optical-to-electrical and electrical-to-optical (hereinafter "optoelectric") modules, containing a pair of optoelectric packages, are contained in one common or standard optoelectric module. The packages are generally used in pairs for two-way communication. Multiple optoelectric modules are used in a common mounting rack to provide multiple communication channels. The optoelectric modules are positioned in the rack in, for example, rows and columns and, to save space the optoelectric modules are positioned as close together as possible.

Each optoelectric module is constructed to be inserted into an opening or cage in the rack. Once the optoelectric module is inserted completely into the cage, the optoelectric module is captured by means of a latch spring inside the cage that is positioned to engage a locking tab on the optoelectric module. To release the optoelectric module and remove it from the cage, the latch spring must be disengaged from the locking tab, after which the optoelectric module can be withdrawn from the cage.

The problems that arise result chiefly from the closeness, size, and shape of the optoelectric modules. The optoelectric modules are generally oblong in shape with a multi-pin electrical plug or socket at the rear or inner end which mates with a multi-pin electrical socket or plug in the cage. The optoelectric module must nest snugly in the cage since any relative movement would eventually cause failures. However, because of the firm fit, withdrawal of the optoelectric module from the cage requires some effort. Because of the closeness and small size of the multiple optoelectric modules in the rack, access to each optoelectric module is limited. Also, the latch spring must be disengaged from the locking tab before the optoelectric module can be withdrawn.

In one prior art solution a simple linear actuator is provided. The linear actuator is pushed forward to raise the latch spring in the cage to release it from the locking tab. For this design, the linear actuator is entirely located under the optoelectric package and, therefore, is difficult to access. That is, one must push the linear actuator forward with one hand to raise the latch spring and then grip and pull the optoelectric package. This combined pushing and pulling action, along with the need to firmly grip whatever portion of the optoelectric package is available for gripping, is very inconvenient.

Another solution used in the prior art uses a locking tab on the end of a lever spring. This, solution requires a different rack and cage arrangement. Instead of moving the latch spring (as described above) in the cage, the locking tab is displaced to clear the latch and unlock the optoelectric package. A problem is that latch springs can be unreliable. For example, the spring can be bent or deformed by repeated use and will no longer effectively lock the optoelectric package into the cage.

It would be highly advantageous, therefore, to remedy the foregoing and other deficiencies inherent in the prior art.

Accordingly, it is an object the present invention to provide a new and improved latching/delatching mechanism for an optoelectric module.

Another object of the present invention is to provide a new and improved latching/delatching mechanism for an optoelectric module that can be easily incorporated into any of the present optoelectric modules and cages.

Another object of the present invention is to provide a new and improved latching/delatching mechanism for an optoelectric module that provides greater accessibility during nesting and removal of optical transceivers from cages.

Another object of the present invention is to provide a new and improved latching/delatching mechanism for an optoelectric module which greatly increases the life and reliability of the mechanism and the optoelectric module.

SUMMARY OF THE INVENTION

Briefly, to achieve the desired objects of the instant invention in accordance with a preferred embodiment thereof, an actuator-based latching/delatching mechanism in combination with nesting structures is provided. The nesting structures include a first structure having a front face with an opening and a second structure designed to be nestingly engaged in the opening in the first structure. A pivot arm having a first surface and a second surface is pivotally mounted between the first structure and the second structure for pivotal movement between a latching orientation in which the second structure is nestingly engaged in the first structure and a delatching orientation in which a delatching force applied to the first surface pivots the second surface against one of the first structure and the second structure to move the second structure at least partially out of the nestingly engaged orientation. An actuator, having latching and delatching orientations, is constructed to mate with the first surface of the pivot arm in the delatching orientation and apply the delatching force to the first surface of the pivot arm.

To further achieve the desired objects of the instant invention, a preferred embodiment of the invention includes an optical module. The optical module includes a housing having a front face with an opening and an optical transceiver designed to be nestingly engaged in the opening in the housing. A front surface of the optical transceiver is approximately flush with the front face of the housing in a fully nestingly engaged orientation. A pivot arm having a first surface and a second surface is pivotally mounted adjacent a rear end of the housing for pivotal movement between a latching orientation in which the transceiver is fully nestingly engaged in the housing and a delatching orientation in which a delatching force applied to the first surface pivots the second surface against the transceiver to move the transceiver at least partially out of the fully nestingly engaged orientation. An elongated actuator is mounted in the housing for reciprocal longitudinal movements between a latching orientation and a delatching orientation in which a first end of the actuator engages the first surface of the pivot arm and applies the delatching force to the first surface of the pivot arm in response to a force applied to a second end of the actuator. The first end of the actuator is positioned adjacent the face of the housing and is accessible exterior of the housing with the actuator in the latching orientation.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE DRAWINGS

Figure 1:
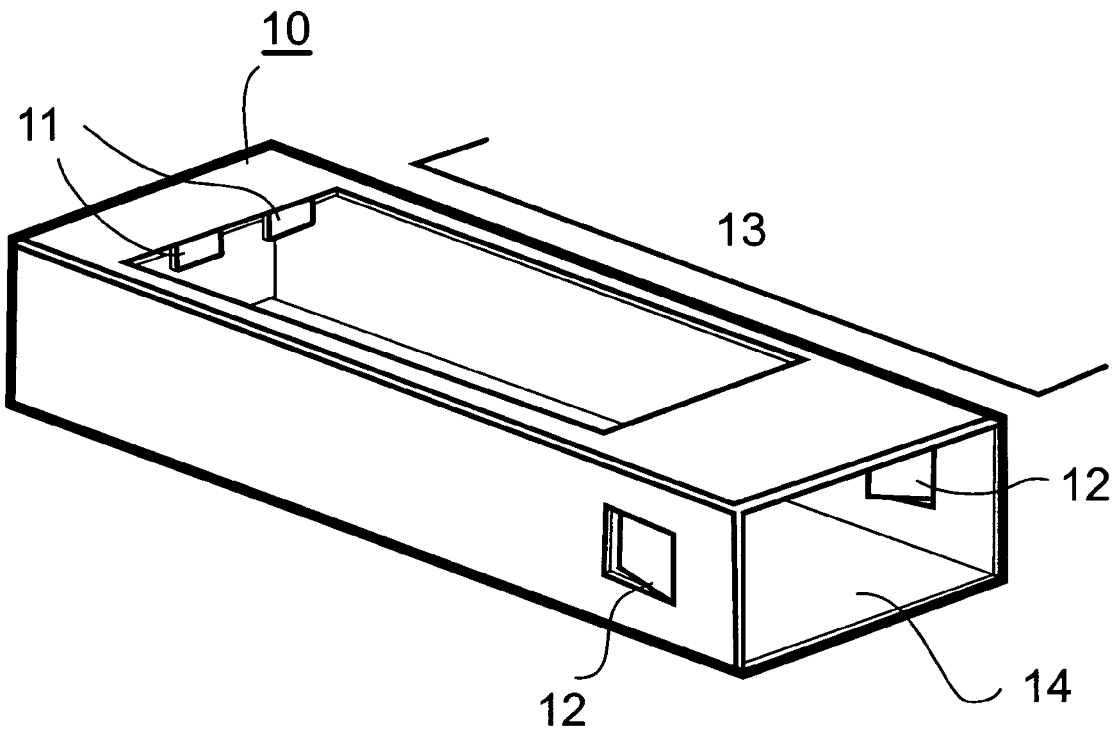
FIG. 1 is a perspective view of an optoelectric cage.

Turning now to FIG. 1, an optoelectric cage 10 is illustrated. Optoelectric cage 10 is designed to hold an optoelectric module 20 (See FIG. 2) which slides into an opening 14. Optoelectric module 20 can be slid rearward a distance 13 as determined by tabs 11. Spring fingers 12 are positioned on cage 10 to hold optoelectric module 20 firmly in place, as will be discussed presently. Further, it will be understood that cage 10 is typically included in an array of adjacent cages. However, only one cage is illustrated and discussed herein for simplicity and ease of understanding.

Figure 2:
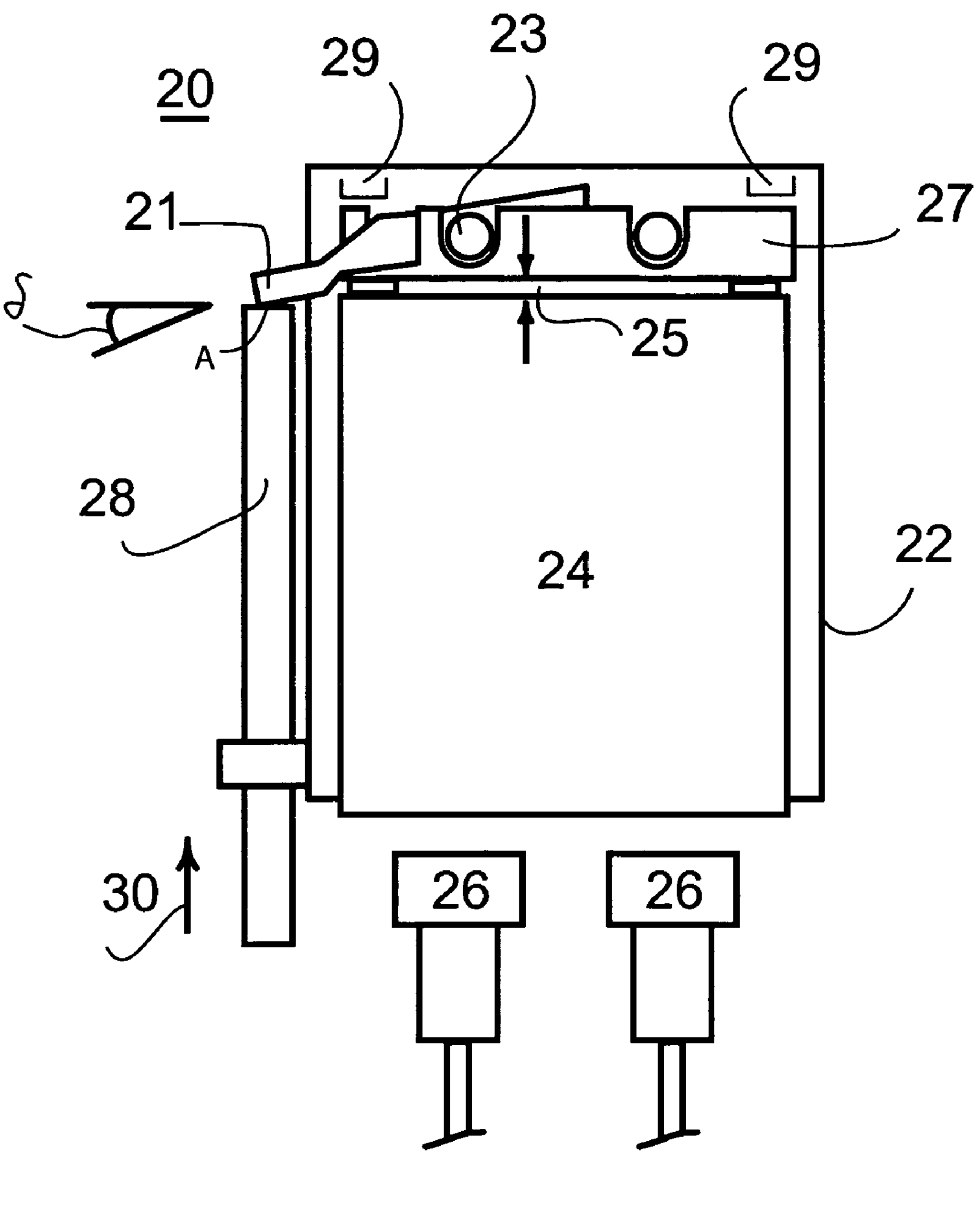
FIG. 2 is a front view of an optoelectric module with a latching/delatching mechanism in a latched position.

Turn now to FIG. 2, which illustrates an optoelectric module 20. In a preferred embodiment, module 20 includes an elongated housing 22, illustrated in more detail in FIG. 4, which can be inserted into cage 10 through opening 14. Housing 22 includes a metal header 17, which is typically formed of a single piece and may be manufactured by some convenient means, such as molding or the like. Header 17 is typically mated, or forms a face, with the elongated portion or portions of housing 22 and includes one or a pair of openings designed to receive an optical transmitter and an optical receiver, hereinafter an optical transceiver 24, which is in optical communication with outside components through optical fibers and connectors 26 and in electrical communication through a multi-pin electrical connector (not shown) at the rear or inner end of housing 22 and cage 10.

Elongated housing 22 is formed of metal and includes detents 23 positioned to frictionally engage an inner surface of cage 10 that is fixedly incorporated in a mounting rack (not shown). In the preferred embodiment, detents 23 of module 20 engage spring fingers 12 in cage 10 so that module 20 is held firmly within cage 10 to minimize vibrations and other such movement which can affect the performance and alignment of module 20. Also, spring fingers 12 can provide an electrical connection between housing 22 and cage 10 to reduce EMI. Hence, detents 23 and spring fingers 12 ensure a positive contact between optoelectric module 20 and cage 10 to prevent relative movement once optoelectric module 20 is properly nested in cage 10 and also ensure that cage 10 and optoelectric module 20 are electrically connected.

Optoelectric module 20 or optical transceiver 24 may have either a plug or socket of a multi-pin electrical connector at the rear end (not shown), whose plug or socket is positioned to mate with a socket or plug in the mounting rack when optoelectric module 20 is properly nested in cage 10 of the mounting rack. In this embodiment, it is anticipated that each optical transceiver 24 includes a printed circuit board with multiple contacts formed on a rearwardly extending surface. The optical transceiver 24 (or each of the transmitter and receiver packages) electrically connect through the multi-pin electrical connector at the rear end of elongated housing 22 to external electrical circuitry when transceiver module 24 is properly inserted into housing 22 and housing 22 is properly nested in cage 10.

In the preferred embodiment, optoelectric package 20 includes a pivot arm 21 fixedly attached to housing 22 with a pivot 23. An elongated ram or actuator 28 is positioned with a rear end proximate to pivot arm 21 housing 22 as illustrated. Actuator 28 is mounted for longitudinal movement parallel with the longitudinal direction of housing 22, direction 30, and a front end 32 extends forwardly beyond the front surface of header or face 17. The rear end of actuator 28 mechanically engages pivot arm 21 at a point 'A' to rotate pivot arm 21 around pivot 23. It will be understood from the following discussion that the rear end of actuator 28 and pivot arm 21 could be pivotally attached, if desired. Also, in some specific applications it might be desirable for actuator 28 to be removable, wherein a common actuator could be inserted and used for all modules in a cage. With transceiver 24 fully nested or engaged in housing 22, pivot arm 21 is rotated counterclockwise to the position illustrated in FIG. 2. Further, in this fully nested orientation, actuator 28 is moved longitudinally forward by pivot arm 21 so that front end 32 extends beyond header 17 and is accessible. A guide element 27 is fixedly attached to elongated housing 22 and guides the movement of pivot arm 21. In this embodiment, pivot arm 21 is capable of moving through an angle $\delta$ from guide element 27 to a stop 29. Stop 29 is positioned on elongated housing 22 and acts to limit the movement of pivot arm 21, for example, when transceiver 24 is removed.

Figure 4:
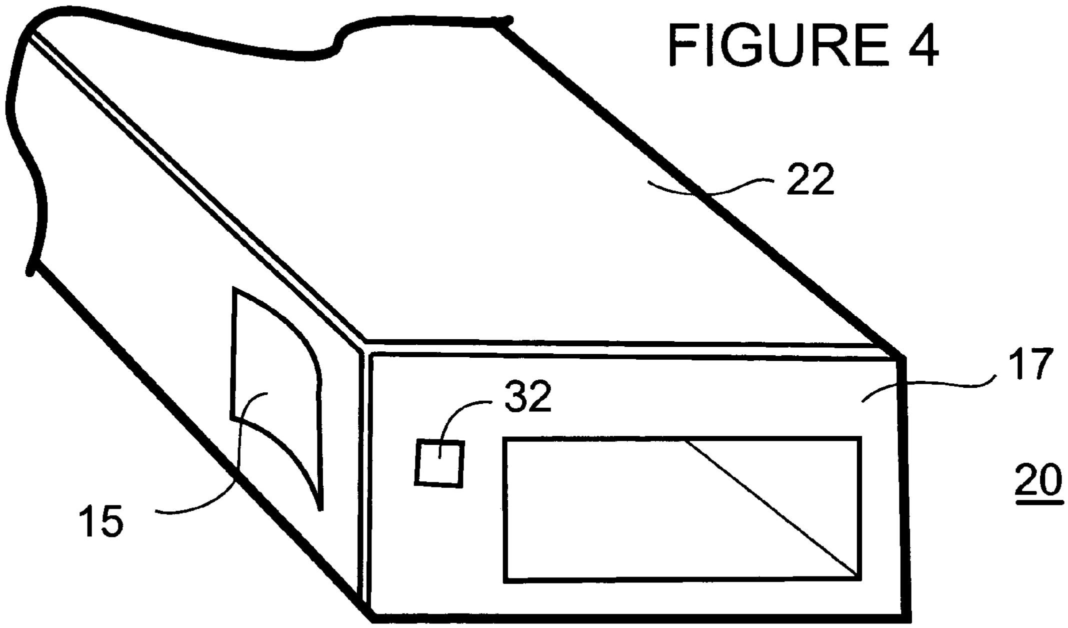
FIG. 4 is a perspective view of a housing associated with the module of FIG. 2.

In this embodiment, elements 21, 23, 27, and 28 form an actuator-based latching/delatching mechanism 19. Mechanism 19 may be formed as a separate assembly and attached to housing 22 during a final assembly, if it is constructed so as not to interfere with the nesting of module 20 within cage 10 (or another cage), otherwise mechanism 19 is formed at least partially within housing 22, as illustrated in FIG. 4. Actuator-based latching/delatching mechanism 19 can be fixedly attached to housing 22 using pins or other mechanical means or at least guide element 27 and stop 29 can be formed initially in housing 22. In this preferred embodiment, actuator-based latching/delatching mechanism 19 includes a metal, which is sturdy and easy to form. However, it will be understood that actuator-based latching/delatching mechanism 19 can be formed from other suitable materials, such as plastic or the like.

Figure 3:
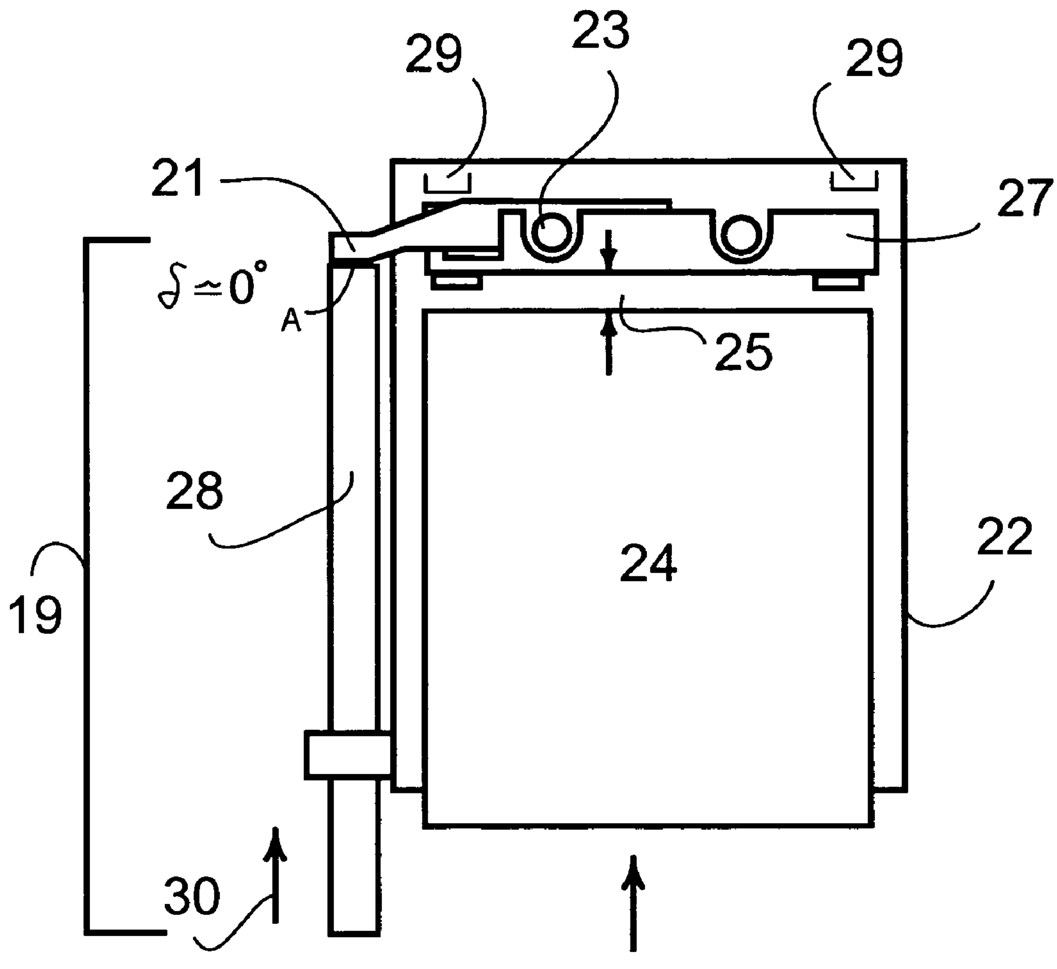
FIG. 3 is a front view of the optoelectric module with a latching/delatching mechanism in an unlatched position.

In the preferred embodiment, actuator-based latching/delatching mechanism 19 is pivotally mounted in housing 22 for movement between a closed position (i.e. $\delta \neq 0°$), illustrated in FIG. 2, and an open position (i.e. $\delta \approx 0°$), illustrated in FIG. 3, as end 32 of actuator 28 is depressed and actuator 28 is moved rearwardly in direction 30. As handle 28 moves in direction 30, a gap 25 between the rear end of transceiver 24 and housing 22 increases so that transceiver 24 is disengaged from housing 22 (and any electrical connections) and the front end can be easily gripped and removed from module 20. It will be understood that actuator-based latching/delatching mechanisms similar to mechanism 19 can be used to fixedly engage and disengage other nesting physical structures as well.

Figure 5:
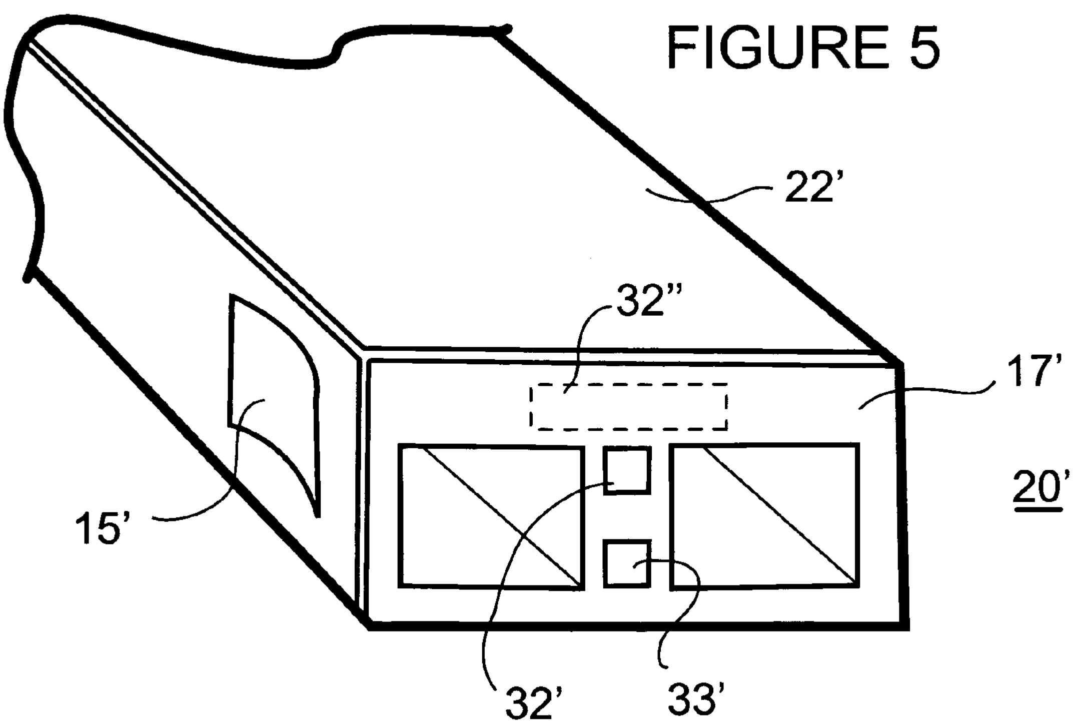
FIG. 5 is a perspective view of another housing associated with the module of FIG. 2.

Referring additionally to FIG. 5, another embodiment of a housing 22' is illustrated. In this embodiment components similar to components illustrated in FIG. 4 are designated with similar numbers and a prime is added to indicate the different embodiment. In this embodiment separate openings are provided for transmitter and receiver packages. Also a pair of actuator ends 32' and 33' are illustrated, one each associated with the transmitter and receiver packages. Thus, in systems using separate transmitter and receiver packages, either package can be removed individually by simply depressing the associated actuator end 32' or 33'. It will of course be understood that actuators could be located at the outer edges of the transmitter and receiver packages so that actuator end 32', for example, would be adjacent the left edge of housing 22' and actuator end 33' would be adjacent the right edge of housing 22'. Also, in either embodiment (i.e. single package or double package) an actuator end 32" could be place above or below the package or packages, as illustrated in broken lines in FIG. 5. In all of these examples, the various components described above would be similar but mounted slightly differently.

Thus, actuator-based latching/delatching mechanism 19 improves the latching and delatching feature because mechanism 19 is in an unobstructed position and accessibility is greatly increased. Also, mechanism 19 is formed of sturdy and reliable material which greatly increases the life and reliability of optoelectric module 20.

Thus, a new and improved latching/delatching mechanism for an optoelectric module is described that can be easily incorporated into any of the present optoelectric modules and cages. Also, the new and improved latching/delatching mechanism for an optoelectric module provides greater accessibility during nesting and removal of optical transceivers from cages. Further, the new and improved latching/delatching mechanism for an optoelectric module greatly increases the life and reliability of the mechanism and the optoelectric module because it can be constructed with very rugged components.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An actuator-based latching/delatching mechanism in combination with nesting structures comprising:

a first structure including a front face with an opening and a second structure designed to be nestingly engaged in the opening in the first structure, the first structure is a housing and the second structure is an optical transceiver;

a pivot arm having a first surface and a second surface, the pivot arm being pivotally mounted between the first structure and the second structure for pivotal movement between a latching orientation in which the second structure is nestingly engaged in the first structure and a delatching orientation in which a delatching force applied to the first surface pivots the second surface against one of the first structure and the second structure to move the second structure at least partially out of the nestingly engaged orientation; and an actuator having latching and delatching orientations, the actuator being constructed to mate with the first surface of the pivot arm in the delatching orientation and apply the delatching force to the first surface of the pivot arm.

2. An actuator-based latching/delatching mechanism in combination with nesting structures comprising:

a first structure including a front face with an opening and a second structure designed to be nestingly engaged in the opening in the first structure;

a pivot arm having a first surface and a second surface, the pivot arm being pivotally mounted within the opening in the first structure between the first structure and the second structure for pivotal movement between a latching orientation in which the second structure is nestingly engaged in the first structure and a delatching orientation in which a delatching force applied to the first surface pivots the second surface against one of the first structure and the second structure to move the second structure at least partially out of the nestingly engaged orientation; and an actuator having latching and delatching orientations, the actuator being constructed to mate with the first surface of the pivot arm in the delatching orientation and apply the delatching force to the first surface of the pivot arm, the actuator is an elongated rod mounted for reciprocal longitudinal movements between a latching orientation and a delatching orientation in which a first end of the rod engages the first surface of the pivot arm and applies the delatching force to the first surface of the pivot arm in response to a force applied to a second end of the rod.

3. An actuator-based latching/delatching mechanism in combination with nesting structures as claimed in claim 2 wherein the pivot arm is constructed of metal.

4. An actuator-based latching/delatching mechanism in combination with nesting structures as claimed in claim 2 wherein the pivot arm is an elongated device with the first surface and the second surface of the pivot arm formed adjacent opposite ends of the pivot arm.

5. An actuator-based latching/delatching mechanism in combination with an optical module comprising:

an optical module including a housing having a front face with an opening and an optical transceiver designed to be nestingly engaged in the opening in the housing;

a pivot arm having a first surface and a second surface, the pivot arm being pivotally mounted between the housing and the transceiver for pivotal movement between a latching orientation in which the transceiver is nestingly engaged in the housing and a delatching orientation in which a delatching force applied to the first surface pivots the second surface against one of the housing and the transceiver to move the transceiver at least partially out of the nestingly engaged orientation; and an actuator having latching and delatching orientations, the actuator being constructed to mate with the first surface of the pivot arm in the delatching orientation and apply the delatching force to the first surface of the pivot arm.

6. An actuator-based latching/delatching mechanism in combination with an optical module comprising:

an optical module including a housing having a front face with an opening and an optical transceiver designed to be nestingly engaged in the opening in the housing, a front surface of the optical transceiver being approximately flush with the front face of the housing in a fully nestingly engaged orientation;

a pivot arm having a first surface and a second surface, the pivot arm being pivotally mounted adjacent a rear end of the housing for pivotal movement between a latching orientation in which the transceiver is fully nestingly engaged in the housing and a delatching orientation in which a delatching force applied to the first surface pivots the second surface against the transceiver to move the transceiver at least partially out of the fully nestingly engaged orientation; and an elongated actuator mounted in the housing for reciprocal longitudinal movements, the actuator being movable between a latching orientation and a delatching orientation in which a first end of the actuator engages the first surface of the pivot arm and applies the delatching force to the first surface of the pivot arm in response to a force applied to a second end of the actuator, the first end of the actuator being positioned adjacent the face of the housing and accessible exterior of the housing with the actuator in the latching orientation.

* * * * *